J. M. SIGOURNEY.
Car Wheel.

No. 15,935.  Patented Oct. 21, 1856.

UNITED STATES PATENT OFFICE.

JOHN M. SIGOURNEY, OF WATERTOWN, NEW YORK.

CAST-IRON RAILROAD-CAR WHEEL.

Specification of Letters Patent No. 15,935, dated October 21, 1856.

*To all whom it may concern:*

Be it known that I, JOHN M. SIGOURNEY, of Watertown, Jefferson county, in the State of New York, have invented a new and useful Improvement in Railroad-Car Wheels; and I do hereby declare that the following is a full, clear, and exact description of the same, reference being had to the accompanying drawing, making a part of this specification, in which—

Figure 1:
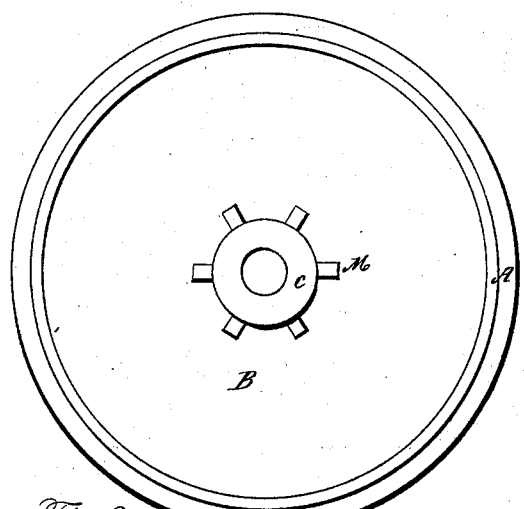
Figure 3:
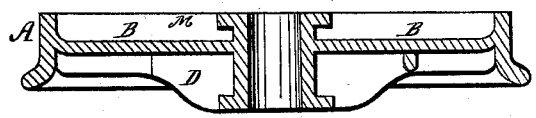
Figure 2:
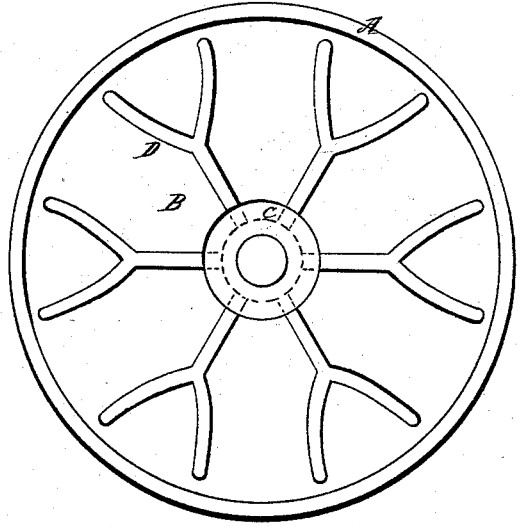

Figure 1 represents the front elevation of my improved wheel; Fig. 2, the back elevation; Fig. 3, a section through the center of the wheel and Fig. 4 a section of a wheel of ordinary construction, for the sake of illustration.

Similar letters of reference indicate corresponding parts in the several figures.

A is the tread of the wheel, B the plate, C the hub plate and M the hub braces or ribs.

My improvement consists in the mode of constructing cast-iron car wheels by arranging the different parts of the wheel in the manner hereinafter described, thus producing the uniform cooling of the whole wheel in every direction and every part when cast, and enabling me to manufacture single plate wheels at a cheaper cost, but of stronger and more durable quality than any that have yet been made.

To enable others skilled in the art to make and use my invention I will proceed to describe it.

The wheel is formed of a single vertical plate, placed corresponding to the central portion of the tread, so that the vertical strains upon the wheel, *i. e.* those produced by the weight of the cars and the reaction from the rail, may pass directly through the said plate. The plate that extends from the hub to the rim of the wheel is perpendicular to the hub and curves slightly at the tread, only for convenience in molding (the thickness however is preserved uniform throughout the whole plate), which is the principal condition of its capacity of resistance. In equalizing and proportioning the thickness of the wheel, however, the tread and flange when cast against a "chill" will have a greater thickness than other portions to compensate for their more rapid cooling while in contact with the said "chill," so that when said "chill" is removed and the wheel is ready for the process of cooling there shall be the same amount of unobstructed heat in each superficial inch of area of said tread and flange as in the other parts of the wheel.

The advantages of a single and flat plate over corrugated, curved or hollow or double wheels are striking, among which I may mention, 1st, greater strength from the nature of the strain passing directly through the whole depth of the plate. This is not the case in undulating and curved plates or hollow wheels. 2d. Greater security, as fractures can be more readily detected by sounding them. 3d. Lightness, by reducing the dead weight of material, a very important consideration in railroads. 4th. Economy, as the quantity of iron is necessarily less than in any shape other than a straight plane surfaced plate and because their cost of molding and casting is much less, and finally the inconvenience arising from the "drumming" of hollow wheels is entirely done away with.

The single plate wheel is rendered entirely efficient by the following accessory parts, which I consider the most important part of my improvement, as it enables me to equalize and proportion the thickness as herein described and has fully insured my entire success in the manufacture of car-wheels without fracture in any instance:

1. The mode of bracing the plate on both sides. The interior braces or ribs are of the same thickness as the plate and radiate from the central hub toward the rim or tread of the wheel. To equalize their action in the most practical manner, I carry the ribs to the middle of the radius of the disk, where they (the ribs) divide into two branches, the ends or extremities of which terminate at the rim at equal distances from each other. There are also lesser braces on the outside of the plate at the hub for the purpose of connecting all the parts together and for strengthening them. These however are not so important and I may not employ them in all cases.

2. The construction of the hub of equal thickness with the plate, by which I remove the iron from the point of junction of the hub with the plates and add it to the extremities of the hub, thus avoiding the large mass of metal as in the ordinary form of wheel at the point mentioned, without impairing the strength of said extremities. The annular flanges thus formed at the ends of the hub, I make of the same thickness as the plate when connected with the braces. But should I employ no braces on the outside or should the interior braces be joined to the hub, as has been described, but of less width at that point, so that they would not be connected with the flange, but entirely separate therefrom, then the said flanges can be made of greater thickness than the hub or plate without injury to the uniform cooling of the wheel, because they (the flanges) will have no connection with the plate by means of the braces and will not in any manner influence the contraction of any other part of the wheel in cooling. This form of hub having the addition of metal as mentioned and the braces in connection with the plate as accessories has great strength to resist the pressure of the axles when fitted or pressed on to them and to endure the strain from the same cause when running on the road (which is a very severe trial) and are not so liable to split as the ordinary form in consequence of the increased strength at the extremities.

In the ordinary form of hubs in car-wheels of single plate the ends cannot be strengthened without adding correspondingly to the whole body of the hub, thus increasing the weight of metal and the liability to fracture in cooling, whereas in my form the ends can be strengthened to a very great extent by the addition of metal where it is needed, without increasing its quantity at the point of junction of the hub and plate.

Figure 4:
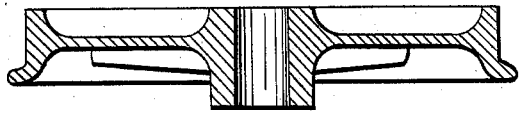

Fig. 4 illustrates the unequal manner of the cooling of wheels of the ordinary construction, the injurious effect of which is too well known to need any comment.

Claim:

The formation of the hub of an iron wheel cast in one piece, in the manner described, viz: recessing the same by means of annular flanges bordering it inside, outside or both in and outside, when combined with the single plate and braces as set forth.

In testimony whereof I have signed my name to this specification before two subscribing witnesses.

JNO. M. SIGOURNEY.

Witnesses:
 GEO. A. BAGLEY,
 E. I. SEWALL.